Oct. 5, 1943.  A. L. PARKER  2,330,841
TUBE COUPLING
Filed March 14, 1941
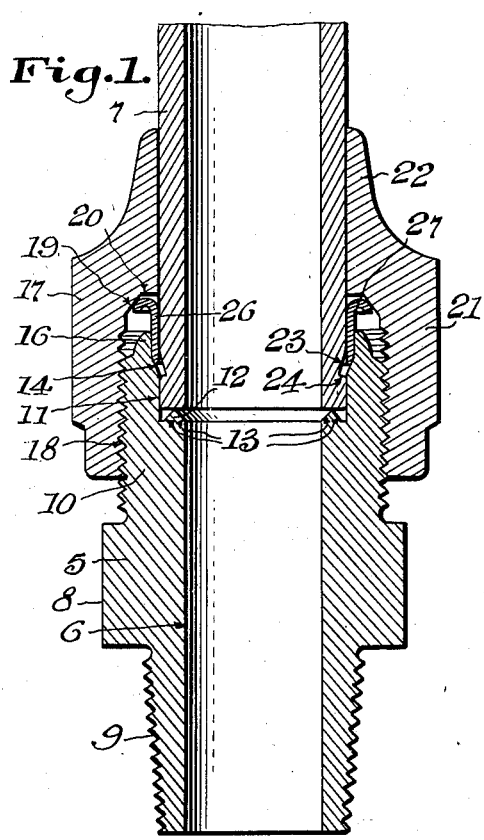
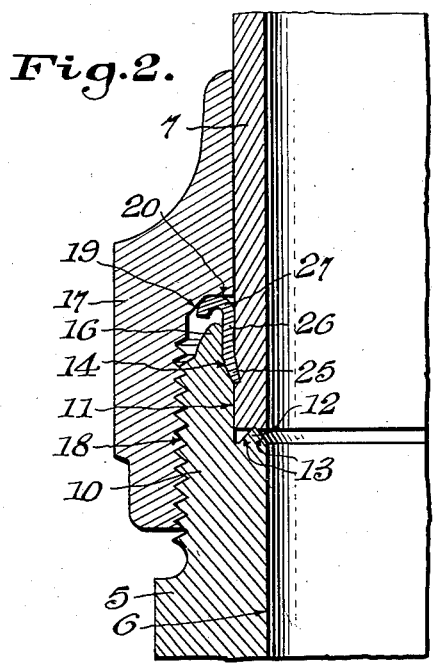
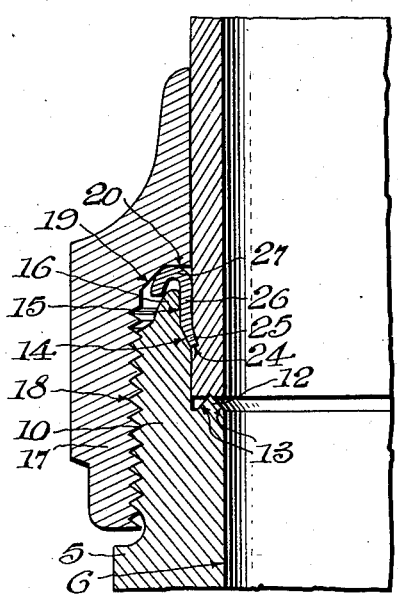
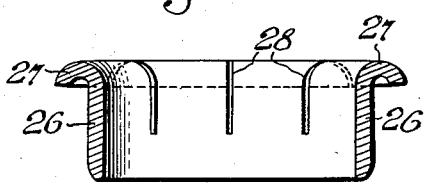
Inventor
Arthur L. Parker
By Mason & Porter
Attorneys Patented Oct. 5, 1943

2,330,841

UNITED STATES PATENT OFFICE 2,330,841

TUBE COUPLING

Arthur L. Parker, Cleveland, Ohio

Application March 14, 1941, Serial No. 383,419

9 Claims. (Cl. 285—86)

The invention relates generally to tube couplings in which a tube is securely clamped at its end between threadably engaged male and female elements, and it primarily seeks to provide a novel form of coupling in which the clamping of the tube is effected by a ferrule surrounding the tube between the male and female elements and which is caused to securely clamp the tube and seal the joint by movement imparted thereto by tight threading of said elements one onto the other.

An object of the invention is to provide a coupling of the character stated in which provision is made for forcing the ferrule into vibration dampening contact with the tube at a point longitudinlly spaced from the end of the tube.

Another object of the invention is to provide a coupling of the character stated in which the tube is forced into line contact with the seat formed in a novel manner on one of the coupling elements so as to be effective over a wide range of tube wall thickness.

A further object of the invention is to provide a coupling of the character stated in which the end of the ferrule is tightly clamped in blunt end seating and sealing contact with a pre-formed abutment shoulder formed in the wall of the tube.

With the above and other objects in view that will hereinafter appear, the nature of the invention will be more fully understood by following the detailed description, the appended claims, and the several views illustrated in the accompanying drawing.

In the drawing—

Figure 1 is a central longitudinal sectional view illustrating the improved tube coupling, the loosely assembled condition of the coupling being shown;

Fig. 2 is an enlarged fragmentary sectional view of the coupling illustrating the normal assembly condition thereof;

Fig. 3 is a view similar to Figure 2 and illustrates an abnormal pressure assembly condition of the coupling;

Fig. 4 is an enlarged detail sectional view illustrating a modified form of ferrule, and Fig. 5 is an enlarged detail sectional view illustrating a further modified form of ferrule.

In the example of embodiment of the invention illustrated in the accompanying drawing, the male element 5 is provided with an axial bore 6 of substantially the same diameter as the inside diameter of the tube 7 which is to be coupled. The male element includes a non-circular body portion 8 from one end of which extends an externally threaded and tapered mounting portion 9, and from the other end of which extends an externally threaded female element receiving extension 10. The male element 5 is counterbored as at 11, and this counterbore provides a tube end abutment shoulder which takes the form of an annular line contact ridge 12 defined by upwardly converging wall portions 13. The seating ridge 12 thus formed is presented for line contact with the end of a tube receivable in the male element counterbore 11 within the wall thickness of tubes which might be so inserted. In other words, the seating ridge 12 is placed so as to be effective over a wide range of tube wall thicknesses, it being understood that tubes of varied wall thicknesses may be used in the improved coupling.

The male element counterbore 11 also includes a flared enlargement or extension 14 which merges into a cylindrical bore enlargement or counterbore extension 15, and the male element extension 10 terminates in a reduced diameter nose or end extension 16 within which said enlargement or counterbore 15 is formed. It will be observed that the external diameter of the nose or extension 16 is somewhat smaller than the externally threaded portion 10 of the male element, thereby to provide a space or chamber surrounding said nose or extension 16 when the male and female elements are assembled in the manner illustrated in Figures 1 and 3 of the drawing.

The female element 17 includes an internally threaded bore 18 which is threadable onto the externally threaded extension 10 of the male element. The internally threaded bore 18 of the female element terminates in an inwardly and upwardly tapered wall portion 19 which merges into a transverse abutment wall 20, and the female element includes a non-circular nut portion 21. The female element may also include a tube encircling sleeve extension 22.

At a point longitudinally spaced from the end extremity thereof, the tube 7 is provided with a tapered cut or reduction 23 which serves to provide an abrupt abutment and joint sealing shoulder 24 within the diametrical limits of said tube. The shoulder 24 is engageable by the blunt end 25 of a clamping ferrule or ring 26 which is initially shaped in the form of a thin metallic shell, as indicated in Figure 1, and including an outwardly and downwardly curled top portion 27.

The counterbore 15 within the nose extension 16 is spaced outwardly from the external surface of the tube 7 a distance sufficient to accommodate the positioning of the ferrule 26 so as to receive the lower end of the ferrule between the reduced diameter nose 16 and the outer surface of the tube 7. In forming the coupling, the parts are assembled in the manner illustrated in Figure 1, and this figure indicates the loosely assembled condition of the coupling before the actual clamping of the tube has been effected. In this initial positioning of the parts, the curled upper end of the ferrule is in engagement with the tapered wall 19 of the female element but is slightly spaced from contact with the transverse wall 20 of said element.

As the female element is threaded home on the male element extension 10, the first effect of this movement is to cause the tapered wall 19 to engage the curled end 27 of the ferrule and force the upper end of the ferrule inwardly into vibration dampening contact with the tube 7. When the amount of ferrule contracting or tube contacting action has been completed, the curled end 27 of the ferrule will then be engaged by the transverse abutment wall 20 and the ferrule will be moved longitudinally toward the tube end abutment shoulder 24, this movement being consummated to effect the normal assembly of the coupling illustrated in Figure 2 of the drawing, in which condition the lower end extremity of the ferrule is displaced inwardly or contracted by the flared wall portion 14 of the male element and the blunt end extremity thereof caused to engage in sealing contact with the abutment shoulder 24. This displacement inwardly of the lower end extremity of the ferrule is accomplished without imposing pressures effective to radially distort or displace portions of the tube 7 because of the cooperative relation of the tube clearance 23 and the female element flare 14 and the abrupt abutment of the blunt end 25 of the ferrule with the tube abutment shoulder 24.

The longitudinal movement of the ferrule under pressure of the transverse abutment shoulder 20 also is effected without distortion or displacement of the main body portion of the ferrule because of the confining effect of the counterbore extension 15 within the nose 16 of the male element and when the end extremity of the ferrule is pressed forcibly against the abutment shoulder 24, the lower extremity of the tube 7 is pressed tightly against the annular ridge 12 causing the latter to impinge slightly in line contact in the end wall thickness of said tube.

It sometimes happens that an operator will apply the female element too tightly, or continue the couple clamping action beyond the normal position illustrated in Figure 2. The reduced diameter of the nose 16 assures against undesirable displacement and distortion of parts by permitting the upper end of the ferrule to curl additionally into the space surrounding said nose in the manner illustrated in Figure 3.

In Figure 4 of the drawing there is illustrated a slight modification of the ferrule. If desired, the ferrule may be split through its upper end at spaced intervals about the circumference thereof, as at 28, so as to facilitate the inward deflection thereof by engagement with the tapered wall 19 for tube clamping and vibration dampening purposes.

By causing the upper or curled end of the ferrule to be displaced inwardly into gripping contact with the external surface of the tube 7, the tube is gripped and tube vibrations are dampened at a point spaced longitudinally from the reduction in the diameter of the tube brought about by formation of the abutment shoulder 24 and in this manner a more efficient coupling is provided and breakages are minimized.

Figure 5 of the drawing illustrates a further modification of the ferrule in which the advance or clamping end of the ferrule is split at spaced intervals as indicated at 29 in order to facilitate the contracting of the end into abutted relation with the shoulder on the tube. When this form of ferrule is used, then the seal will be wholly obtained by the embedding of the ridge on the coupling member into the metal at the end of the tube.

The coupling as shown, described and claimed, embodies improvements in the couplings disclosed in my copending applications Serial No. 262,965, filed March 20, 1939, and Serial No. 305,371, filed November 20, 1939. It is obvious that the feature of structure whereby the ferrule clamps the tube so as to dampen vibrations, and the feature of structure wherein the seat is so formed as to make line contact with the end of the tube over a wide range of tube wall thickness, may be used in connection with a ferrule construction having a sharp edge which cuts into the tube and forms a holding shoulder, as set forth in my companion application Serial No. 262,965. It is also obvious that the sleeve may be placed on the tube having a pre-formed shoulder and contracted so as to be brought into engagement therewith prior to the placing of the tube in the coupling in which the camming shoulder will positively hold the coupling in engagement with the shoulder when wrench pressure is applied for the clamping of the tube.

It is, of course, to be understood that the details of structure and arrangement of parts may be variously changed and modified without departing from the spirit and scope of my invention.

Having thus described the invention, what I claim as new and desire to secure by Letters Patent, is:

1. A coupling for tubes comprising coupling members having threaded engagement with each other, one of said coupling members having a bore in axial alignment with the tube bore and a counterbore for receiving the end of the tube, said counterbore terminating in an annular seating ridge positioned and shaped so as to make line contact within the wall thickness of the end extremity of the tube, a metallic sleeve surrounding the tube and adapted to engage said tube, and means on the other coupling member operating through said sleeve for forcing the tube endwise into sealing contact with said ridge.

2. A coupling for a tube having a preformed abutment shoulder in its outer surface facing away from the end of the tube, said coupling including a coupling member having a bore in axial alignment with the tube bore and a counterbore for receiving the end of the tube, said counterbore terminating in an annular seating ridge positioned and shaped so as to make line contact within the wall thickness of the end extremity of the tube, a metallic sleeve surrounding the tube and having an end portion engageable with said shoulder, and means on the other coupling member operable through said sleeve for forcing the sleeve endwise against the tube shoulder and the tube endwise into sealing contact with said ridge without internal deformation of the tube structure.

3. A coupling for tubes comprising coupling members having threaded engagement with each other, one of said coupling members having a bore in axial alignment with the tube bore and a counterbore for receiving the end of the tube, said counterbore terminating in an annular seating ridge positioned and shaped so as to make line contact within the wall thickness of the end extremity of the tube, a metallic sleeve surrounding the tube and adapted to engage said tube, and means on the other coupling member operating through said sleeve for forcing the tube endwise into sealing contact with said ridge, said first-named coupling member having an extension presenting a cylindriform wall closely embracing said sleeve in parallel spaced relation to the external surface of the tube and confining the sleeve against buckling while forcing the tube endwise against said ridge.

4. A coupling for a tube having a preformed abutment shoulder in its outer surface facing away from the end of the tube, said coupling including a coupling member having a bore in axial alignment with the tube bore and a counterbore for receiving the end of the tube, said counterbore terminating in an annular seating ridge positioned and shaped so as to make line contact within the wall thickness of the end extremity of the tube, a metallic sleeve surrounding the tube and having an end portion engageable with said shoulder, and means on the other coupling member operable through said sleeve for forcing the sleeve endwise against the tube shoulder and the tube endwise into sealing contact with said ridge without internal deformation of the tube structure, said first-named coupling member having an extension presenting a cylindriform wall closely embracing said sleeve in parallel spaced relation to the external surface of the tube and confining the sleeve against buckling while forcing the tube endwise against said ridge.

5. A coupling for tubes comprising coupling members having threaded engagement with each other, one of said coupling members having a bore in axial alignment with the tube bore and a counterbore for receiving the end of the tube, said counterbore terminating in an annular seating ridge positioned and shaped so as to make line contact within the wall thickness of the end extremity of the tube, a metallic sleeve surrounding the tube and adapted to engage said tube, and means on the other coupling member operating through said sleeve for forcing the tube endwise into sealing contact with said ridge, said last-named means including a flared and transverse abutment walls successively engageable with the outer end of the sleeve for first forcing said outer end inwardly a predetermined definite limited distance into vibration dampening contact with the tube and then the tube endwise into sealing contact with the ridge, said transverse wall being disposed so as to not exert any force component inwardly against said sleeve thereby to avoid inward deformation of said tube.

6. A coupling for tubes comprising coupling members having threaded engagement with each other, one of said coupling members having a bore in axial alignment with the tube bore and a counterbore for receiving the end of the tube, said counterbore terminating in an annular seating ridge positioned and shaped so as to make line contact within the wall thickness of the end extremity of the tube, a metallic sleeve surrounding the tube and having an outwardly curled end extremity at one end and adapted to engage said tube, and means on the other coupling member operating through said sleeve for forcing the tube endwise into sealing contact with said ridge, said first-named coupling member having an extension presenting a cylindriform wall closely embracing said sleeve in parallel spaced relation to the external surface of the tube and confining the sleeve against buckling, and said last-named coupling member having a flared and transverse abutment wall successively engageable with the curled end of the sleeve for first forcing the curled end of the sleeve inwardly a predetermined definite limited distance into vibration dampening contact with the tube and then operating through the sleeve for forcing the tube endwise into sealing contact with the ridge, said transverse wall being disposed so as to not exert any force component inwardly against said sleeve thereby to avoid inward deformation of said tube.

7. A coupling for a tube having a preformed abutment shoulder in its outer surface facing away from the end of the tube, said coupling including a coupling member having a bore in axial alignment with the tube bore and a counterbore for receiving the end of the tube, said counterbore terminating in an annular seating ridge positioned and shaped so as to make line contact within the wall thickness of the end extremity of the tube, a metallic sleeve surrounding the tube and having an outwardly curled end extremity at one end and an end portion engageable with said shoulder, and means on the other coupling member operable through said sleeve for forcing the tube into sealing contact with said ridge, said first-named coupling member having an extension presenting a cylindriform wall closely embracing said sleeve in parallel spaced relation to the external surface of the tube and confining it against buckling, and said last-named coupling member having a flared and transverse abutment wall successively engageable with the curled end of the sleeve for first forcing the curled end of the sleeve inwardly a predetermined definite limited distance into vibration dampening contact with the tube and then forcing the sleeve endwise against the tube shoulder for forcing the tube endwise into sealing contact with the ridge, said transverse wall being disposed so as to not exert any force component inwardly against said sleeve thereby to avoid inward deformation of said tube, said sleeve being longitudinally slitted at spaced intervals about its circumference through the curled end thereof to facilitate the contracting of the sleeve into vibration dampening engagement with the tube.

8. A coupling for tubes comprising coupling members having threaded engagement with each other, one of said coupling members having a bore in axial alignment with the tube bore and a counterbore for receiving the end of the tube, said counterbore terminating in an annular seat, a metallic sleeve surrounding the tube and adapted to engage said tube, and means on the other coupling member operating through said sleeve for forcing the tube endwise into sealing contact with said seat, said last-named means including a flared and transverse abutment wall successively engageable with the outer end of the sleeve for first forcing said outer end inwardly a predetermined definite limited distance into vibration dampening contact with the tube and then the tube endwise into sealing contact with the seat, said transverse wall being disposed so as to not exert any force component inwardly against said sleeve thereby to avoid inward deformation of said tube.

9. In a coupling for tubes comprising coupling members having threaded engagement with each other, one of said coupling members having a bore adapted to receive an end portion of the tube, said coupling member having a camming surface at the entrance of said bore, a clamping sleeve surrounding the tube, said sleeve at the inner end thereof being dimensioned so that when moved endwise into contact with said camming surface it will be contracted into sealing and holding engagement with the tube, said other coupling member having a shoulder adapted to engage the sleeve for moving said sleeve endwise, cooperating surfaces associated with said last named coupling member and said sleeve for contracting the outer end of the sleeve into engagement with the tube for dampening vibrations imparted thereto, when said coupling and sleeve are moved relative to each other, said shoulder and sleeve being initially spaced to permit said relative movement and operating when brought together to limit further contraction of the outer end of the sleeve and operating when in engagement to move the inner end of said sleeve into said sealing and holding engagement with the tube.

ARTHUR L. PARKER.